(12) United States Patent
Aramizu et al.

(10) Patent No.: US 9,062,732 B2
(45) Date of Patent: Jun. 23, 2015

(54) HYDRAULIC PRESSURE SPRING AND METHOD OF MANUFACTURING THE SAME

(75) Inventors: Teruo Aramizu, Fujisawa (JP); Go Tanaka, Ashikaga (JP)

(73) Assignee: OILES CORPORATION, Tokyo (JP)

( * ) Notice: Subject to any disclaimer, the term of this patent is extended or adjusted under 35 U.S.C. 154(b) by 651 days.

(21) Appl. No.: 12/522,405

(22) PCT Filed: Jan. 17, 2008

(86) PCT No.: PCT/JP2008/000044
§ 371 (c)(1),
(2), (4) Date: Aug. 3, 2009

(87) PCT Pub. No.: WO2008/087864
PCT Pub. Date: Jul. 24, 2008

(65) Prior Publication Data
US 2010/0072010 A1    Mar. 25, 2010

(30) Foreign Application Priority Data
Jan. 17, 2007   (JP) .................. 2007-008223

(51) Int. Cl.
*F16F 5/00* (2006.01)
*F16F 9/32* (2006.01)
*F16F 9/22* (2006.01)

(52) U.S. Cl.
CPC ............. *F16F 5/00* (2013.01); *Y10T 29/49615* (2015.01); *F16F 9/3242* (2013.01); *F16F 9/22* (2013.01)

(58) Field of Classification Search
CPC ............... F16F 5/00; F16F 9/30; F16F 9/303; B60G 17/04
USPC ........ 267/64.13, 129, 64.28, 127; 188/322.17
See application file for complete search history.

(56) References Cited

U.S. PATENT DOCUMENTS 2,960,289 A * 11/1960 Westcott, Jr. ............. 244/104 R
3,017,170 A *  1/1962 Westcott, Jr. ................. 267/121
(Continued)

FOREIGN PATENT DOCUMENTS

| JP | 6-330972  | 11/1994 |
|----|-----------|---------|
| JP | 06-330972 | 11/1994 |

(Continued)

OTHER PUBLICATIONS

New Zealand Examination Report in Patent Appln. No. 578066 dated Feb. 14, 2011.

(Continued)

*Primary Examiner* — Bradley King
*Assistant Examiner* — Stephen Bowes
(74) *Attorney, Agent, or Firm* — Nixon & Vanderhye P.C.

(57) ABSTRACT

A hydraulic pressure spring 1 includes a hollow cylindrical cylinder 4 having a threaded portion 3 at one end 2 thereof; a closure means 5 which is threadedly engaged with the threaded portion 3 at the one end 2 of the cylinder 4 and closes the one end 2 of the cylinder 4; a closure means 7 which is provided at the other end 6 of the cylinder 4 and closes the other end 6 of the cylinder 4; a compressible liquid 9 which is sealed in an interior 8 of the cylinder 4 and is pressurized to a predetermined pressure; a rod 10 which is passed through the closure means 5 movably in an axial direction A and causes the liquid 9 in the interior 8 of the cylinder 4 to undergo a pressure rise as the rod 10 enters the interior 8 of the cylinder 4; and a piston 11 disposed in the interior 8 of the cylinder 4 and attached to one end of the rod 10.

4 Claims, 5 Drawing Sheets

(56) References Cited

U.S. PATENT DOCUMENTS

| | | | | |
|---|---|---|---|---|
| 3,256,005 | A | * | 6/1966 | Taylor .................. 267/64.13 |
| 3,442,501 | A | * | 5/1969 | Soderberg ............... 267/64.28 |
| 3,647,199 | A | | 3/1972 | Bhutani et al. |
| 3,722,640 | A | * | 3/1973 | Taylor ..................... 188/316 |
| 3,868,097 | A | * | 2/1975 | Taylor ..................... 267/124 |
| 4,582,303 | A | * | 4/1986 | Taylor .................. 267/64.13 |
| 4,628,579 | A | * | 12/1986 | Taylor ..................... 29/422 |
| 4,828,237 | A | * | 5/1989 | Neff ......................... 267/221 |
| 5,549,281 | A | * | 8/1996 | Hall ......................... 267/119 |

FOREIGN PATENT DOCUMENTS

| | | |
|---|---|---|
| JP | 10-047310 | 2/1998 |
| JP | 2000-002284 | 1/2000 |
| JP | 2000-2284 | 1/2000 |
| JP | 2004-044732 | 2/2004 |
| JP | 2004-44732 | 2/2004 |

OTHER PUBLICATIONS

International Search Report for PCT/JP2008/000044 mailed Apr. 22, 2008.

* cited by examiner

US 9,062,732 B2

HYDRAULIC PRESSURE SPRING AND METHOD OF MANUFACTURING THE SAME

This application is the U.S. national phase of International Application No. PCT/JP2008/000044 filed 17 Jan. 2008 which designated the U.S. and claims priority to Japanese Patent Application No. 2007-008223 filed 17 Jan. 2007, the entire contents of each of which are hereby incorporated by reference.

TECHNICAL FIELD

The present invention relates to a hydraulic pressure spring in which a compressible liquid is sealed in a cylinder and a method of manufacturing the same.

BACKGROUND ART

[Patent Document 1] JP-A-2000-2284
[Patent Document 1] JP-A-10-47310

Hydraulic pressure springs such as shock absorbers, dampers, and the like using a compressible liquid are used in the fields of, for example, rolling stocks, fender devices, production machines, and the like in portions which are required to dampen and absorb large impact energy.

In a hydraulic pressure spring, its performance varies substantially according to the internal pressure imparted to the compressible liquid in its initial state.

With an elastic fluid compression type shock absorber as a hydraulic pressure spring such as the one shown in Patent Document 1, when a piston rod forcibly enters the interior of the cylinder owing to a shock, the volume for accommodating an elastic fluid in the cylinder becomes small as compared with the initial period, so that the elastic fluid sealed in the cylinder is compressed and its pressure increases. This increased pressure serves as a reaction force, and the spring action (restoring action) is generated to push back the impact object and absorb the energy in the process in which the elastic fluid is compressed.

DISCLOSURE OF THE INVENTION

Problems that the Invention is to Solve

In such a spring, in a case where the pressure of the elastic fluid in the cylinder is not set very high as compared with the external pressure, during the impact absorption the initial resisting force is small and relatively large movement of the piston rod occurs, and energy can be absorbed effectively during a small impact. On the other hand, however, in a case where the pressure of the elastic fluid in the cylinder is set high as compared with the external pressure, a kind of trigger action (reaction force) takes place during the impact absorption, so that the movement of the piston rod is not produced by a small impact, and the movement of the piston rod is produced for the first time by a large impact.

In the case where either one of the aforementioned internal pressure conditions is adopted, a means is required for applying a pressure exceeding the external pressure to the elastic fluid which is sealed in the cylinder during the manufacture. As this means, a generally well-known so-called check valve is frequently used therein which allows the fluid to be injected into the interior of the cylinder from the outside but does not allow the fluid to flow out from the interior side of the cylinder.

In the spring using a compressible fluid, a desired reaction force cannot be obtained unless the fluid is pressurized into the interior of the cylinder at a predetermined pressure and is sealed therein, and in a case where a high reaction force is required, the fluid naturally needs to be sealed in at a high pressure. Furthermore, during the impact absorption, the piston rod forcibly enters the cylinder interior to decrease the volume for accommodating the elastic fluid in the cylinder, so that a large pressure is generated in the cylinder interior. Hence, there is a possibility that if there is any slightest gap, the pressurized fluid can blow out or leak to the outside of the cylinder, causing a pressure decline of the compressible fluid and resulting in a decline in the performance. Thus, the sealability constitutes an important issue for stably retaining the high-pressure fluid in the interior of the cylinder over a long period of time and for retaining the higher-pressure fluid during the impact absorption.

Incidentally, with the spring constituted by the cylinder, the piston, and the piston rod and using a pressurized compressible fluid, the efflux of the compressible fluid to the cylinder exterior is likely to occur through a seal member around the piston rod and the check valve for the injection of the fluid. As for the prevention of the efflux of the compressible fluid through the seal member around the piston rod, techniques are adopted in which the configuration of the seal is devised as in the ease of a V-type packing and a U-type packing, for example.

In view of the above-described aspects, an object of the present invention is to provide a hydraulic pressure spring which, without using the check valve constituting a factor causing a decline in the internal pressure, makes it possible to seal the compressible liquid in the interior of the cylinder at a desired pressure and prevent the leakage of the pressurized liquid from the interior of the cylinder to the outside both at normal times and at the time of an impact, as well as a method of manufacturing the same.

Means for Solving the Problems

A hydraulic pressure spring in accordance with the invention comprises: a hollow cylindrical cylinder having a threaded portion at at least one end thereof; one closure means which is threadedly engaged with the threaded portion at the one end of the cylinder and closes the one end of the cylinder; another closure means which is provided at an another end of the cylinder and closes the other end of the cylinder; a compressible liquid which is sealed in an interior of the cylinder and is pressurized to a predetermined pressure; and a rod which is passed through the one or other closure means movably in an axial direction and causes the liquid in the interior of the cylinder to undergo a pressure rise as the rod enters the interior of the cylinder, wherein the liquid sealed in the interior of the cylinder is pressurized to a predetermined level by the threaded insertion of the one closure means into the threaded portion of the cylinder.

According to the hydraulic pressure spring in accordance with the invention, when the rod has received an impact in the axial direction, the rod enters the interior of the cylinder to decrease the volume of the interior of the cylinder, so that the pressure of the compressible liquid sealed in the interior of the cylinder increases. Thus, with an increase of the degree of entry of the rod, the resisting force against the entry of the rod rises, to thereby impart a suitable restoring force characteristic. Further, since the liquid sealed in the interior of the cylinder is pressurized to a predetermined level by the threaded insertion of the one closure means into the threaded portion of the cylinder, it is unnecessary to inject the compressible liquid into the interior of the cylinder through a check valve. Hence, there is no need for giving consideration to the leakage of the liquid from the interior of the cylinder to the outside through the check valve. As compared with the hydraulic pressure spring provided with the check valve, it is possible to prevent the leakage of the liquid from the interior of the cylinder to the outside both at normal times and at the time of an impact, and it is possible to maintain the compressible liquid in the interior of the cylinder with a desired pressure over a long period of time.

As the compressible liquid, it is possible to cite as examples a liquid such as water in which porous bodies having a multiplicity of fine pores, such as those described in JP-A-2004-44732, JP-A-2005-121092, and JP-A-2005-121091 are present in mixed form, or a liquid constituted by organopolysiloxane having fluidity. As the organopolysiloxane having fluidity, it is possible to cite, for example, silicone crude rubber, silicone crude rubber with a filler such as silica compounded therein, and a silicone gel provided with fluidity by suppressing the degree of cross-linking of a liquid silicone rubber. However, non-Newtonian liquids and, inter alia, plastic fluids capable of obtaining the Bingham property are preferable. As the plastic fluids (Bingham fluids), it is possible to cite by way of example clay slips (a suspension with a particle size of 20 to 30 µm), asphalts, paints, greases, pigments, protein solutions, creams, and the like.

The threaded portion of the cylinder may be constituted by an internal thread formed on an inner peripheral surface of the cylinder at the one end thereof or by an external thread formed on an outer peripheral surface of the cylinder at the one end thereof. In the former case, the one closure means may include a closure member which has on its outer peripheral surface an external thread threadedly engaged with the internal thread formed on the inner peripheral surface of the cylinder at the one end thereof. In the latter case, the one closure means may include a closure member having on its inner peripheral surface an internal thread threadedly engaged with the external thread formed on the outer peripheral surface of the cylinder at the one end thereof and a plug member fitted to an inner peripheral surface of the cylinder at the one end thereof by being pressed by the closure member in the axial direction and toward the other end of the cylinder.

The other closure means may have a closing portion which is formed integrally at the other end of the cylinder or a closure member which is threadedly engaged with the other end of the cylinder. In the case where such a closing portion is provided, the cylinder is a so-called bottomed cylinder in a preferred example, and is able to further improve the sealability with respect of the compressible liquid. In the case where the other closure member is provided, an internal thread or an external thread may also be formed on the inner peripheral surface or the outer peripheral surface of the hollow cylindrical cylinder at the other end thereof, while an external thread or an internal thread may be formed on the outer peripheral surface or the inner peripheral surface of the other closure member so as to cause the external thread or the internal thread on the outer peripheral surface or the inner peripheral surface of the other closure member to threadedly engage the internal thread or the external thread on the inner peripheral surface or the outer peripheral surface of the cylinder at the other end thereof, thereby closing the other end of the cylinder, as well as the closure member closing the one end of the cylinder.

In the invention, the hydraulic pressure spring may further comprise a piston disposed in the interior of the cylinder and attached to one end of the rod. In this case, the piston may have an outer peripheral surface between which and the inner peripheral surface of the cylinder a clearance allowing the compressible liquid to flow is formed, whereby the compressible liquid is made to undergo flow through the clearance in the entry of the rod into the interior of the cylinder, so as to effectively dampen the impact energy by the viscous shear resisting force of the compressible liquid. In addition, by adjusting and setting the size of such a clearance, it is possible to obtain a desired impact energy absorption effect.

A method of manufacturing a hydraulic pressure spring according to one aspect of the invention comprises the steps of preparing respectively a hollow cylindrical cylinder which has an internal thread on an inner peripheral surface at an open one end thereof and whose another end is closed by a closing portion formed integrally at the other end and a closure member through which a rod is passed movably in an axial direction and which has an external thread on an outer peripheral surface thereof; injecting a compressible liquid into an interior of the cylinder from an opening at the one end of the cylinder; and threadedly inserting the external thread of the closure member into the internal thread on the inner peripheral surface of the cylinder at the one end thereof to pressurize the liquid injected in the interior of the cylinder and close the one end of the cylinder.

A method of manufacturing a hydraulic pressure spring according to another aspect of the invention comprises the steps of: preparing respectively a hollow cylindrical cylinder having an internal thread on an inner peripheral surface at an open one end thereof and integrally having at another end thereof a closing portion with a through hole provided therein and a closure member having an external thread on an outer peripheral surface thereof; inserting a rod into the through hole of the closing portion to close the other end of the cylinder by the rod and the closing portion; injecting a compressible liquid into an interior of the cylinder from an opening at the one end of the cylinder; and threadedly inserting the external thread of the closure member into the internal thread on the inner peripheral surface of the cylinder at the one end thereof to pressurize the liquid injected in the interior of the cylinder and close the one end of the cylinder.

A method of manufacturing a hydraulic pressure spring according to still another aspect of the invention comprises the steps of: preparing respectively a hollow cylindrical cylinder having an external thread on an outer peripheral surface at an open one end thereof and integrally having at another end thereof a closing portion with a through hole provided therein and a closure member having an internal thread on an inner peripheral surface thereof; inserting a rod into the through hole of the closing portion to close the other end of the cylinder by the rod and the closing portion; injecting a compressible liquid into an interior of the cylinder from an opening at the one end of the cylinder; partially fitting a plug member into an inner peripheral surface of the cylinder at the open one end thereof; and threading the internal thread of the closure member onto the external thread on the outer peripheral surface of the cylinder at the one end thereof to pressurize by means of the plug member the liquid injected in the interior of the cylinder and close the one end of the cylinder.

According to the above-described manufacturing methods, there is provided the step of threadedly inserting the external thread of the closure member into the internal thread on the inner peripheral surface of the cylinder at the one end thereof to pressurize the liquid injected in the interior of the cylinder or the step of threading the internal thread of the closure member onto the external thread on the outer peripheral surface of the cylinder at the one end thereof to pressurize by means of the plug member the liquid injected in the interior of the cylinder. Therefore, even if the check valve is not used, the compressible liquid can be injected into the interior of the cylinder, and a desired initial pressure can be imparted to the compressible liquid. Hence, it is possible to provide a hydraulic pressure spring which is capable of preventing the leakage of the high-pressure liquid from the interior of the cylinder to the outside both at normal times and at the time of an impact and of substantially maintaining the initial characteristic over a long period of time.

Advantages of the Invention

According to the invention, it is possible to provide a hydraulic pressure spring which, without using the check valve constituting a factor causing a decline in the internal pressure, makes it possible to seal the compressible liquid in the interior of the cylinder at a desired pressure and prevent the leakage of the pressurized liquid from the interior of the cylinder to the outside both at normal times and at the time of an impact, as well as a method of manufacturing the same.

Next, a more detailed description will be given of the mode for carrying out the invention with reference to the preferred embodiments illustrated in the drawings. It should be noted that the invention is not limited to these embodiments.

BEST MODE FOR CARRYING OUT THE INVENTION

Figure 1:
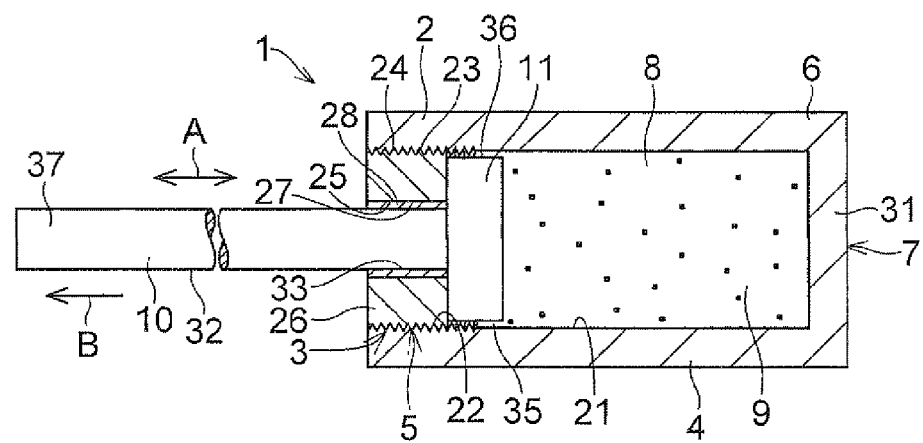
FIG. 1 is an explanatory cross-sectional view of a preferred embodiment of the invention.

In FIG. 1, a hydraulic pressure spring 1 in accordance with this embodiment is comprised of a hollow cylindrical cylinder 4 having a threaded portion 3 at one end 2 thereof; a closure means 5 which is threadedly engaged with the threaded portion 3 at the one end 2 of the cylinder 4 and closes the one end 2 of the cylinder 4; a closure means 7 which is provided at the other end 6 of the cylinder 4 and closes the other end 6 of the cylinder 4; a compressible liquid 9 which is sealed in an interior 8 of the cylinder 4 and is pressurized to a predetermined pressure; a rod 10 which is passed through the closure means 5 movably in an axial direction A and causes the liquid 9 in the interior 8 of the cylinder 4 to undergo a pressure rise as the rod 10 enters the interior 8 of the cylinder 4; and a piston 11 disposed in the interior 8 of the cylinder 4 and attached to one end of the rod 10.

The threaded portion 3 of the cylinder 4 is constituted by an internal thread 22 formed on an inner peripheral surface 21 of the cylinder 4 at the one end 2 thereof. The closure means 5 includes a hollow cylindrical closure member 26 which has on its outer peripheral surface 24 an external thread 23 threadedly engaged with the internal thread 22 and has a through hole 25 therethrough, as well as a hollow cylindrical seal member 28 secured to an inner peripheral surface 27 defining the through hole 25 of the closure member 26. The closure means 5 closes an opening at the one end 2 of the cylinder 4 in cooperation with the rod 10 passed through the seal member 28 slidably in the axial direction A.

The closure means 7 has a closing portion 31 formed integrally at the other end 6 of the cylinder 4, and the closing portion 31 itself closes an opening at the other end 6 of the cylinder 4. Thus, the cylinder 4 having the closing portion 31 is a so-called bottomed cylinder.

The compressible liquid 9 which is sealed in the interior 8 of the cylinder 4 without a gap is constituted by a plastic liquid which is a non-Newtonian liquid, and is pressurized to a predetermined level by the threaded insertion of the external thread 23 of the closure member 26 in the closure means 5 into the internal thread 22 of the threaded portion 3 of the cylinder 4.

The rod 10 is passed through the seal member 28 in a state in which its outer peripheral surface 32 is brought into contact with an inner peripheral surface 33 of the seal member 28 slidably in the axial direction A. Thus, the rod 10 is passed through the closure means 5 movably in the axial direction A.

The piston 11 has an outer peripheral surface 36 which forms with respect to the inner peripheral surface 21 of the cylinder 4 an annular clearance 35 through which the compressible liquid 9 can flow. Thus, the piston 11 is adapted to cause the flow of the liquid 9 through the clearance 35 as the piston 11 moves in the axial direction A on the basis of the movement of the cylinder 4 in the same direction.

Figure 2:
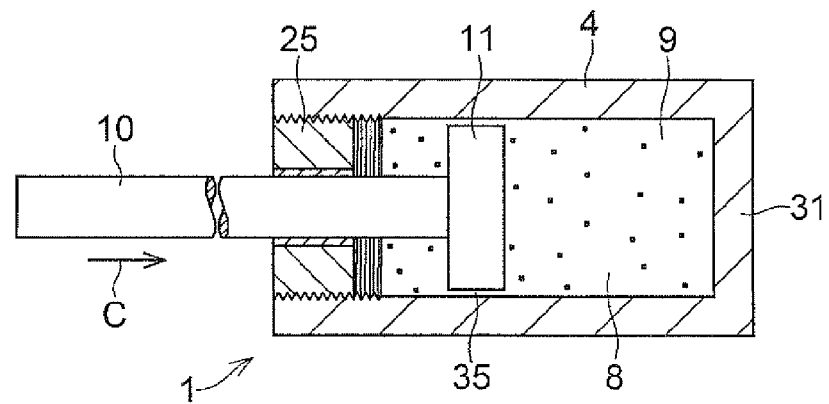
FIG. 2 is a diagram explaining the operation of the embodiment shown in FIG. 1.

With the above-described hydraulic pressure spring 1, as a result of the fact that a force is constantly applied to the rod 10 by the pressurized liquid 9 in a B direction which is one direction in the axial direction A, in the case where the hydraulic pressure spring 1 is not installed on an object which dampens and absorbs impact energy, such as a rolling stock, a fender device, a production machine, or the like, the rod 10 assumes the state in which it projects outside the cylinder 4 by the largest degree, as shown in FIG. 1. Meanwhile, in the case where the hydraulic pressure spring 1 is used by being installed such that the other end 37 of the rod 10 is connected to a movable object and the cylinder 4 itself or the closing portion 31 is connected to a fixed object, when the rod 10 enters the interior 8 of the cylinder 4 in the movement of the movable object in one direction in the axial direction A due to an impact, i.e., in the movement thereof in a C direction, as shown in FIG. 2, owing to an increase in the volume of the rod 10 in the interior 8 of the cylinder 4, the liquid 9 is further pressurized and the flow of the liquid 9 through the clearance 35 is produced. As a result, the impact energy of the movable object is dampened and absorbed by the pressurization and the flow of the liquid 9. Meanwhile, as the result of the relief of the impact force in the C direction, the rod 10 is moved in the B direction by the pressurized liquid 9 in the interior 8 of the cylinder 4 and is returned to its original position shown in FIG. 1.

According to the hydraulic pressure spring 1, when the rod 10 has received an impact from the outside in the C direction, the rod 10 enters the interior 8 of the cylinder 4 to decrease the volume of the interior 8 of the cylinder 4, so that the pressure of the compressible liquid 9 sealed in the interior 8 of the cylinder 4 increases. Thus, with an increase of the degree of entry of the rod 10, the resisting force against the entry of the rod 10 rises, to thereby impart a suitable restoring force characteristic. Further, since the liquid 9 sealed in the interior 8 of the cylinder 4 is pressurized to a predetermined level by the threaded insertion of the closure member 26 into the threaded portion 3 of the cylinder 4, it is unnecessary to inject the compressible liquid 9 into the interior 8 of the cylinder 4 through a check valve. Hence, there is no need for giving consideration to the leakage of the liquid from the interior of the cylinder to the outside through the check valve. As compared with the hydraulic pressure spring provided with the cheek valve, it is possible to prevent the leakage of the liquid 9 from the interior 8 of the cylinder 4 to the outside both at normal times and at the time of an impact, and it is possible to maintain the compressible liquid 9 in the interior 8 of the cylinder 4 with the desired pressure over a long period of time.

Figure 3:
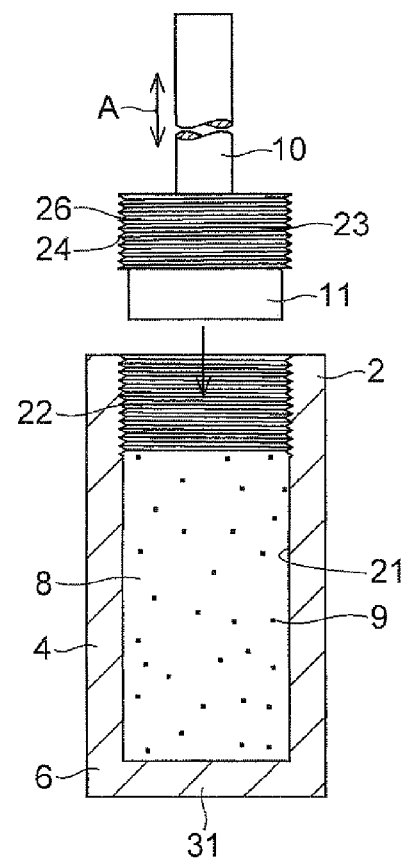
FIG. 3 is a diagram explaining a manufacturing method in accordance with the embodiment shown in FIG. 1.
Figure 4:
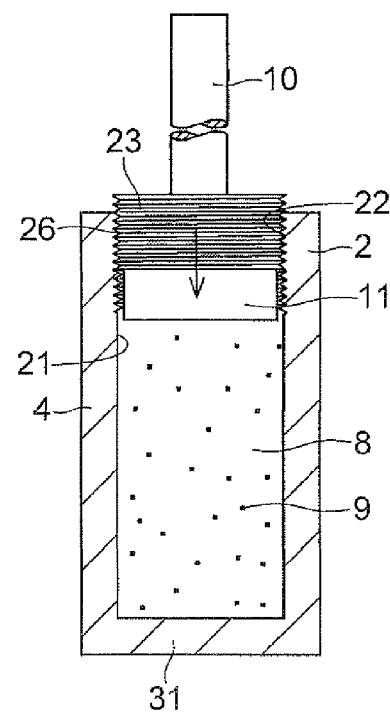
FIG. 4 is a diagram explaining the manufacturing method in accordance with the embodiment shown in FIG. 1.

The hydraulic pressure spring 1 can be manufactured as follows. As shown in FIG. 3, the following are respectively prepared: the hollow cylindrical cylinder 4 which has the internal thread 22 on its inner peripheral surface 21 at the open one end 2 thereof and in which the opening at the other end 6 thereof is closed by the closing portion 31 formed integrally at the other end 6, as well as the closure member 26 through which the rod 10 with the piston 11 is passed movably in the axial direction A with the seal member 28 interposed therebetween and which has the external thread 23 on its outer peripheral surface 24. The compressible liquid 9 is injected into the interior 8 of the cylinder 4 from the opening at the one end 2 of that cylinder 4. Next, as shown in FIG. 4, the external thread 23 of the closure member 26 is threadedly inserted into the internal thread 22 on the inner peripheral surface 21 of the cylinder 4 at the one end 2 thereof to pressurize the liquid 9 injected in the interior 8 of the cylinder 4 and close the opening at the one end 2 of the cylinder 4 by the rod 10, the closure member 26, and the seal member 28. After the liquid 9 is pressurized to a predetermined level by the threaded insertion of the external thread 23 into the internal thread 22, the closure member 26 is fixed, as required, to the one end 2 of the cylinder 4 by welding or the like, thereby obtaining the hydraulic pressure spring 1.

With the above-described hydraulic pressure spring 1, although the closure means 7 has the closing portion 31 formed integrally at the other end 6 of the cylinder 4, the closure means 7 may alternatively have a closure member which is separate from the cylinder 4 and is threadedly engaged with the other end 6 of the cylinder 4 in the same way as the closure member 26, so as to close the other end 6 of the cylinder 4.

Figure 5:
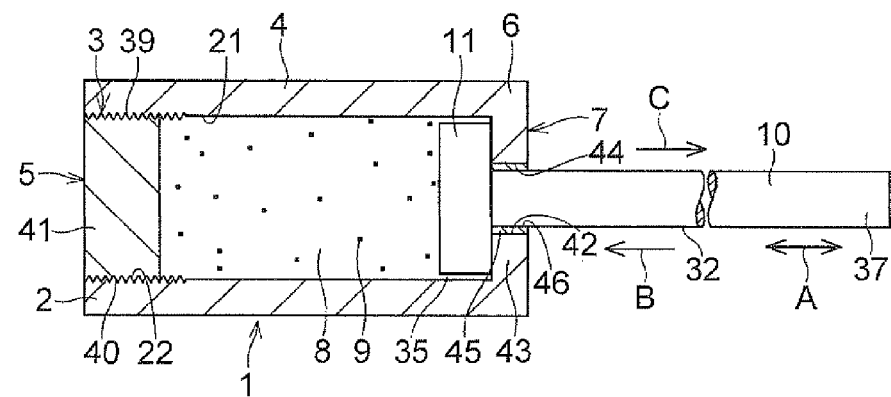
FIG. 5 is an explanatory cross-sectional view of another preferred embodiment of the invention.

In addition, with the above-described hydraulic pressure spring 1, although the closure means 5 has the hollow cylindrical closure member 26 and the hollow cylindrical seal member 28 secured to the inner peripheral surface 27 of the closure member 26, the closure means 5 may alternatively have a columnar closure member 41 having an external thread 40 on its outer peripheral surface 39, as shown in FIG. 5. Such a closure member 41 itself closes the opening at the one end 2 of the cylinder 4. In this case, the closure means 7 may be constituted by an annular closing portion 43 formed integrally at the other end 6 of the cylinder 4 and having a through hole 42 and by a hollow cylindrical seal member 45 secured to an inner peripheral surface 44 defining the through hole 42 of the closing portion 43. Further, the rod 10 with the piston 11 may be disposed so as to be passed through the seal member 45 in a state in which the outer peripheral surface 32 of the rod 10 is brought into contact with an inner peripheral surface 46 of the seal member 45 slidably in the axial direction A. Such a closure means 7 having the closing portion 43 and the seal member 45 closes the opening at the other end 6 of the cylinder 4 in cooperation with the rod 10. The hydraulic pressure spring 1 shown in FIG. 5 is comprised of the hollow cylindrical cylinder 4 having the internal thread 22 as the threaded portion 3 at the one end 2 thereof; the closure member 41 of the closure means 5 which is threadedly engaged with the internal thread 22 of the threaded portion 3 at the one end 2 of the cylinder 4 and closes the one end 2 of the cylinder 4; the closing portion 43 and the seal member 45 of the closure means 7 which are provided at the other end 6 of the cylinder 4 and close the other end 6 of the cylinder 4; the compressible liquid 9 which is sealed in the interior 8 of the cylinder 4 and is pressurized to a predetermined pressure; the rod 10 which is passed through the seal member 45 of the closure means 7 movably in the axial direction A and causes the liquid 9 in the interior 8 of the cylinder 4 to undergo a pressure rise as the rod 10 enters the interior 8 of the cylinder 4; and the piston 11 disposed in the interior 8 of the cylinder 4 and attached to the one end of the rod 10. With this hydraulic pressure spring 1 as well, the compressible liquid 9 sealed in the interior 8 of the cylinder 4 without a gap is constituted by a Bingham fluid, i.e., a plastic fluid, and is pressurized to a predetermined level by the threaded insertion of the external thread 40 of the closure member 41 in the closure means 5 into the internal thread 22 of the threaded portion 3 of the cylinder 4.

Figure 6:
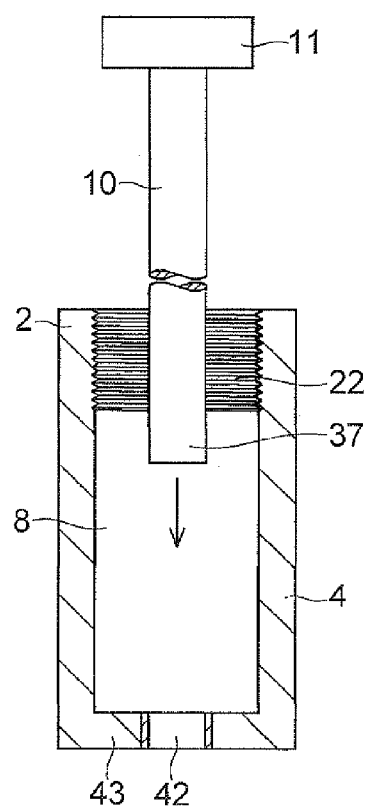
FIG. 6 is a diagram explaining a manufacturing method in accordance with the embodiment shown in FIG. 5.
Figures 7, 8:
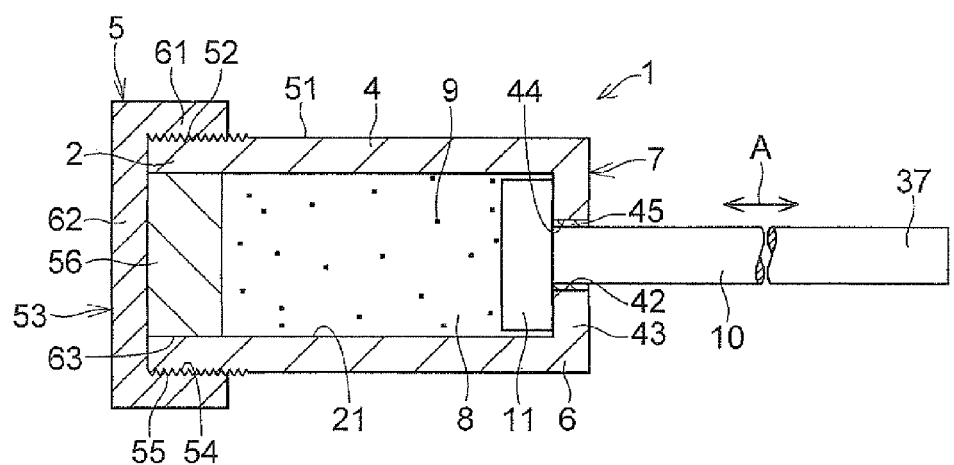
FIG. 7 is a diagram explaining the manufacturing method in accordance with the embodiment shown in FIG. 5.
FIG. 8 is an explanatory cross-sectional view of still another preferred embodiment of the invention.

The hydraulic pressure spring 1 shown in FIG. 5 can be manufactured as follows. The following are respectively prepared: the hollow cylindrical cylinder 4 which has the internal thread 22 on its inner peripheral surface 21 at the open one end 2 thereof and integrally has at the other end 6 thereof the closing portion 43 in which the through hole 42 is provided and the seal member 45 is secured to the inner peripheral surface 44 defining that through hole 42; the closure member 41 having the external thread 40 on its outer peripheral surface 39; and the rod 10 to one end of which the piston 11 is secured. As shown in FIG. 6, the other end 37 of the rod 10 with the piston 11 is inserted into the interior 8 of the cylinder 4 from the opening at the one end 2 of the cylinder 4. Then, the rod 10 is inserted into the through hole 42 of the closing portion 43 until the piston 11 is brought into contact with the closing portion 43, as shown in FIG. 7, to thereby close the opening at the other end 6 of the cylinder 4 by the rod 10, the closing portion 43, and the seal member 45. After the insertion, the compressible liquid 9 is injected into the interior 8 of the cylinder 4 from the opening at the one end 2 of that cylinder 4. After the injection, the external thread 40 of the closure member 41 is threadedly inserted into the internal thread 22 on the inner peripheral surface 21 of the cylinder 4 at the one end 2 thereof to pressurize the liquid 9 injected in the interior 8 of the cylinder 4 and close the opening at the one end 2 of the cylinder 4. After the liquid 9 is pressurized to a predetermined level by the threaded insertion of the external thread 40 into the internal thread 22, the closure member 41 is fixed to the one end 2 of the cylinder 4 by welding or the like, thereby obtaining the hydraulic pressure spring 1 shown in FIG. 5.

Also with the above-described hydraulic pressure spring 1 shown in FIG. 5, as a result of the fact that a force is constantly applied to the rod 10 by the pressurized liquid 9 in the C direction, in the case where the hydraulic pressure spring 1 is not installed on an object which dampens and absorbs impact energy, such as a rolling stock, a fender device, a production machine, or the like, the rod 10 assumes the state in which it projects outside the cylinder 4 by the largest degree, as shown in FIG. 5. Meanwhile, in the case where the hydraulic pressure spring 1 is used by being installed such that the other end 37 of the rod 10 is connected to a movable object and the cylinder 4 itself or the closure member 41 is connected to a fixed object, when the rod 10 enters the interior 8 of the cylinder 4 in the movement of the movable object in the B direction due to an impact, owing to an increase in the volume of the rod 10 in the interior 8 of the cylinder 4, the liquid 9 is further pressurized and the flow of the liquid 9 through the clearance 35 is produced. As a result, the impact energy of the movable object is dampened and absorbed by the pressurization and the flow of the liquid 9. Meanwhile, as the result of the relief of the impact force in the B direction, the rod 10 is moved in the C direction by the pressurized liquid 9 in the interior 8 of the cylinder 4 and is returned to its original position shown in FIG. 5.

Also with the hydraulic pressure spring 1 shown in FIG. 5, when the rod 10 has received an impact from the outside in the B direction in the axial direction A, the rod 10 enters the interior 8 of the cylinder 4 to decrease the volume of the interior 8 of the cylinder 4, so that the pressure of the compressible liquid 9 sealed in the interior 8 of the cylinder 4 increases. Thus, with an increase of the degree of entry of the rod 10, the resisting force against the entry of the rod 10 rises, to thereby impart a suitable restoring force characteristic. Further, since the liquid 9 sealed in the interior 8 of the cylinder 4 is pressurized to a predetermined level by the threaded insertion of the closure member 41 into the threaded portion 3 of the cylinder 4, it is unnecessary to inject the compressible liquid 9 into the interior 8 of the cylinder 4 through a check valve. Hence, there is no need for giving consideration to the leakage of the liquid from the interior of the cylinder to the outside through the check valve. As compared with the hydraulic pressure spring provided with the check valve, it is possible to prevent the leakage of the liquid 9 from the interior 8 of the cylinder 4 to the outside both at normal times and at the time of an impact, and it is possible to maintain the compressible liquid 9 in the interior 8 of the cylinder 4 with the desired pressure over a long period of time.

Each of the above-described hydraulic pressure springs 1 is an example in which the internal thread 22 is formed on the inner peripheral surface 21 of the cylinder 4 at the one end 2 thereof, the external thread 23 or 40 is formed on the outer peripheral surface 24 or 39 of the closure member 26 or 41, and the internal thread 22 and the external thread 23 or 40 are threadedly engaged with each other. Alternatively, however, as shown in FIG. 8, the closure means 5 may be configured by forming an external thread 52 on an outer peripheral surface 51 of the cylinder 4 at the one end 2 thereof and forming an internal thread 55 on an inner peripheral surface 54 of a closure member 53, and by thus including the closure member 53 having on its inner peripheral surface 54 the internal thread 55 threadedly engaged with the external thread 52 formed on the outer peripheral surface 51 of the cylinder 4 at the one end 2 thereof and a plug member 56 fitted to the inner peripheral surface 21 of the cylinder 4 at the one end 2 thereof by being pressed by the closure member 53 in the axial direction A and toward the other end 6 of the cylinder 4. Such a closure means 5 having the closure member 53 and the plug member 56 closes the opening at the one end 2 of the cylinder 4.

The hydraulic pressure spring 1 shown in FIG. 8 is similarly comprised of the hollow cylindrical cylinder 4 having the external thread 52 as the threaded portion 3 at the one end 2 thereof; the closure member 53 of the closure means 5 which is threadedly engaged with the external thread 52 of the threaded portion 3 at the one end 2 of the cylinder 4 and closes the one end 2 of the cylinder 4, as well as the plug member 56; the closing portion 43 and the seal member 45 of the closure means 7 which are provided at the other end 6 of the cylinder 4 and close the other end 6 of the cylinder 4 in cooperation with the rod 10; the compressible liquid 9 which is sealed in the interior 8 of the cylinder 4 and is pressurized to a predetermined pressure; the rod 10 which is passed through the seal member 45 of the closure means 7 movably in the axial direction A and causes the liquid 9 in the interior 8 of the cylinder 4 to undergo a pressure rise as the rod 10 enters the interior 8 of the cylinder 4; and the piston 11 disposed in the interior 8 of the cylinder 4 and attached to the one end of the rod 10. The compressible liquid 9 sealed in the interior 8 of the cylinder 4 without a gap is constituted by a Bingham fluid, i.e., a plastic fluid, and is pressurized to a predetermined level by means of the plug member 56 by the threading of the internal thread 55 of the closure member 53 in the closure means 5 onto the external thread 52 of the threaded portion 3 of the cylinder 4.

The closure member 53 has a hollow cylindrical portion 61 with the internal thread 55 formed on the cylindrical inner peripheral surface 54 and a disk-shaped cover portion 62 formed integrally with the hollow cylindrical portion 61. The columnar plug member 56 has an outer peripheral surface 63 of the same diameter as that of the inner peripheral surface 21 of the cylinder 4, and is adapted to be closely fitted at its outer peripheral surface 63 to the inner peripheral surface 21 of the cylinder 4.

Figure 9:
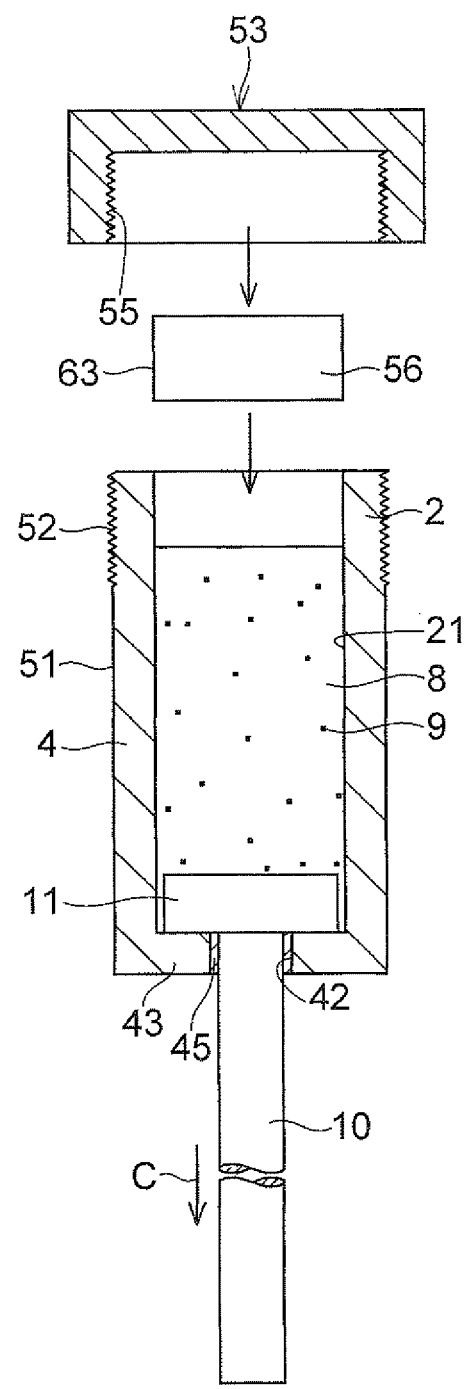
FIG. 9 is a diagram explaining a manufacturing method in accordance with the embodiment shown in FIG. 8.

The hydraulic pressure spring 1 shown in FIG. 8 can be manufactured as follows. The following are respectively prepared: the hollow cylindrical cylinder 4 which has the external thread 52 on its outer peripheral surface 51 at the open one end 2 thereof and integrally has at the other end 6 thereof the closing portion 43 in which the through hole 42 is provided and the seal member 45 is secured to the inner peripheral surface 44 defining that through hole 42; the closure member 53 having the internal thread 55 on its inner peripheral surface 54; the plug member 56 having the outer peripheral surface 63 of the same diameter as that of the inner peripheral surface 21; and the rod 10 to one end of which the piston 11 is secured. In the same way as described above, the other end 37 of the rod 10 with the piston 11 is inserted into the interior 8 of the cylinder 4 from the opening at the one end 2 of the cylinder 4. Then, as shown in FIG. 9, until the piston 11 is brought into contact with the closing portion 43, the rod 10 is inserted into the through hole 42 of the closing portion 43 with the seal member 45 interposed therebetween, to thereby close the opening at the other end 6 of the cylinder 4 by the rod 10, the closing portion 43, and the seal member 45. After the insertion, the compressible liquid 9 is injected into the interior 8 of the cylinder 4 from the opening at the one end 2 of that cylinder 4. After the injection, the plug member 56 is partially fitted to the inner peripheral surface 21 of the cylinder 4 at the one end 2 thereof from the opening at the one end 2 of the cylinder 4 so as to be fitted at the outer peripheral surface 63. After the fitting, the internal thread 55 of the closure member 53 is threaded onto the external thread 52 on the outer peripheral surface 51 of the cylinder 4 at the one end 2 thereof to press the plug member 56 in the C direction, thereby pressurizing by means of the plug member 56 the liquid 9 injected in the interior 8 of the cylinder 4 and closing the opening at the one end 2 of the cylinder 4 by the closure member 53 and the plug member 56. After the liquid 9 is pressurized to a predetermined level by means of the plug member 56 by the threaded insertion of the external thread 52 into the internal thread 55, the closure member 53 is fixed to the one end 2 of the cylinder 4 by welding or the like, thereby obtaining the hydraulic pressure spring 1 shown in FIG. 8.

In this manufacturing method, the injection of the compressible liquid 9 into the interior 8 of the cylinder 4 is effected with a predetermined quantity such that when, in the fitting of the plug member 56 to the one end 2 of the cylinder 4, the plug member 56 is brought into contact with the liquid 9 injected in advance, the plug member 56 partially projects to the outside from the opening at the one end 2 of the cylinder 4. The threading of the internal thread 55 of the closure member 53 onto the external thread 52 on the outer peripheral surface 51 of the cylinder 4 at the one end 2 thereof is effected such that the plug member 56 partially projecting to the outside from the opening at the one end 2 of the cylinder 4 is pressed toward the other end 6 of the cylinder 4, thereby pressurizing the liquid 9 injected in the interior 8 of the cylinder 4.

The hydraulic pressure spring 1 shown in FIG. 8 is used in the same way as the hydraulic pressure spring 1 shown in FIG. 5, and is adapted to operate in a similar manner.

The invention claimed is:

1. A hydraulic pressure spring comprising:
a hollow cylindrical cylinder having a threaded portion at at least one end thereof;
one closure mechanism which is threadedly engaged with the threaded portion at the one end of said cylinder and closes the one end of said cylinder;
another closure mechanism which is provided at another end of said cylinder and closes the other end of said cylinder;
a compressible liquid which is sealed in an interior of said cylinder and is pressurized to a predetermined pressure;
a rod which is passed through said one closure mechanism movably in an axial direction and causes the compressible liquid in the interior of said cylinder to undergo a pressure rise as said rod enters the interior of said cylinder; and
a piston which is disposed in the interior of said cylinder and attached to one end of said rod,
said compressible liquid sealed in the interior of said cylinder being pressurized to a predetermined level by the threaded insertion of said one closure mechanism into the threaded portion of said cylinder,
said threaded portion of said cylinder being constituted by an internal thread formed on an inner peripheral surface of said cylinder at the one end thereof,
said one closure mechanism including a closure member which has on an outer peripheral surface thereof an external thread threadedly engaged with the internal thread and has a through hole, and a hollow cylindrical seal member secured to an inner peripheral surface defining the through hole of the closure member,
said through hole of the closure member including one open end which opens at one annular end face of the closure member in the axial direction and another open end which opens at another annular end face of the closure member in the axial direction,
wherein the one annular end face of the closure member extends from said through hole of the closure member to the inner peripheral surface of said cylinder in a single plane, the plane being orthogonal to the axial direction,
said through hole of the closure member extending from the one annular end face of the closure member to the other annular end face of the closure member in the axial direction,
said one annular end face of the closure member being adapted to abut the piston in the axial direction,
said one annular end face of the closure member being adapted to be directly exposed to said compressible liquid,
said seal member extending from the one open end of the through hole to the other open end of the through hole in the axial direction and being fixed to the inner peripheral surface of the closure member defining the through hole of the closure member,
said rod being passed through the seal member in a state in which an outer peripheral surface thereof is brought into contact with an inner peripheral surface of the seal member slidably in the axial direction,
said closure member and said seal member closing the one end of said cylinder in cooperation with the rod passed through the seal member slidably in the axial direction,
said external thread of the closure member having one end terminated at the one annular end face of the closure member, another end terminated at the other annular end face of the closure member and a first length in the axial direction,
said internal thread of said cylinder having a second length which is substantially longer than the first length of the external thread in the axial direction,
said piston having an outer peripheral surface between which and the inner peripheral surface of said cylinder a clearance allowing said compressible liquid to flow is formed, and
a distance between the one end and the other end of said external thread having the first length in the axial direction.

2. The hydraulic pressure spring according to claim 1, wherein said another closure mechanism has a closing portion which is formed integrally at the another end of said cylinder or a closure member which is threadedly engaged with the another end of said cylinder.

3. A hydraulic pressure spring comprising:
a hollow cylindrical cylinder having a threaded portion at at least one end thereof;
one closure mechanism which is threadedly engaged with the threaded portion at the one end of said cylinder and closes the one end of said cylinder;
another closure mechanism which is provided at another end of said cylinder and closes the other end of said cylinder;
a compressible liquid which is sealed in an interior of said cylinder and is pressurized to a predetermined pressure;
a rod which is passed through said one closure mechanism movably in an axial direction and causes the compressible liquid in the interior of said cylinder to undergo a pressure rise as said rod enters the interior of said cylinder, and
a piston which is disposed in the interior of said cylinder and attached to one end of said rod,
said compressible liquid sealed in the interior of said cylinder being constituted by a Bingham fluid and being pressurized to a predetermined level by the threaded insertion of said one closure mechanism into the threaded portion of said cylinder,
said threaded portion of said cylinder being constituted by an internal thread formed on an inner peripheral surface of said cylinder at the one end thereof,
said one closure mechanism including a closure member which has on an outer peripheral surface thereof an external thread threadedly engaged with the internal thread and has a through hole, and a hollow cylindrical seal member secured to an inner peripheral surface defining the through hole of the closure member,
said rod being passed through the seal member in a state in which an outer peripheral surface thereof is brought into contact with an inner peripheral surface of the seal member slidably in the axial direction, said closure member and said seal member closing the one end of said cylinder in cooperation with the rod passed through the seal member slidably in the axial direction, said external thread of the closure member having one end terminated at one annular end face of the closure member, another end terminated at another annular end face of the closure member and a first length in the axial direction, said internal thread of said cylinder has a second length which is substantially longer than the first length of the external thread in the axial direction, wherein the one annular end face of the closure member extends from said through hole of the closure member to the inner peripheral surface of said cylinder in a single plane, the plane being orthogonal to the axial direction, said one annular end face of the closure member being adapted to be directly exposed to said compressible liquid, said piston having an outer peripheral surface between which and the inner peripheral surface of said cylinder a clearance allowing said compressible liquid to flow is formed, and a distance between the one end and the other end of said external thread having the first length in the axial direction.

4. The hydraulic pressure spring according to claim 3, wherein said another closure mechanism has a closing portion which is formed integrally at the another end of said cylinder or a closure member which is threadedly engaged with the another end of said cylinder.

* * * * *